US009410609B1

(12) United States Patent
Jongebloed et al.

(10) Patent No.: US 9,410,609 B1
(45) Date of Patent: Aug. 9, 2016

(54) PASSIVELY FED BYPASS FILTER FOR SPLASH LUBRICATION

(71) Applicant: BorgWarner Inc., Auburn Hills, MI (US)

(72) Inventors: Jesse Jongebloed, Clawson, MI (US); Michael Palazzolo, Madison Heights, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/868,750

(22) Filed: Sep. 29, 2015

(51) Int. Cl.
*F16H 57/04* (2010.01)

(52) U.S. Cl.
CPC ........ *F16H 57/0404* (2013.01); *F16H 57/0457* (2013.01)

(58) Field of Classification Search
CPC ............ F16H 57/0404; F16H 57/0457; F01M 2001/1042
USPC ....................................................... 184/6.25
See application file for complete search history.

(56) References Cited

U.S. PATENT DOCUMENTS

| | | | |
|---|---|---|---|
| 6,634,459 B1 * | 10/2003 | Litkenhus et al. ........... 184/6.12 |
| 2004/0226766 A1 * | 11/2004 | Cook et al. .................... 180/233 |
| 2006/0063633 A1 * | 3/2006 | Turner et al. .................. 475/220 |
| 2006/0254974 A1 * | 11/2006 | Khalil et al. .................. 210/420 |
| 2008/0190497 A1 * | 8/2008 | Varda ............................. 137/574 |
| 2009/0014248 A1 * | 1/2009 | Yamashita et al. ........... 184/6.24 |
| 2009/0107769 A1 * | 4/2009 | Sato et al. ...................... 184/6.2 |
| 2009/0127174 A1 * | 5/2009 | Shinbori et al. ......... 210/167.08 |
| 2009/0139922 A1 * | 6/2009 | Poskie et al. ............. 210/167.08 |
| 2010/0024591 A1 * | 2/2010 | Yamaguchi .................. 74/606 R |
| 2010/0038296 A1 * | 2/2010 | Beer et al. ................ 210/167.03 |
| 2014/0158594 A1 * | 6/2014 | Schneider et al. ....... 210/167.08 |

* cited by examiner

*Primary Examiner* — William E Dondero
*Assistant Examiner* — Robert T Reese
(74) *Attorney, Agent, or Firm* — Young Basile Hanlon & MacFarlane P.C.

(57) ABSTRACT

An apparatus for reducing contaminants in lubrication for a transfer case. The apparatus utilizes the tendencies of a transfer case to splash and otherwise project internal sealed lubricant in numerous directions within the case, along with gravitational forces acting on the lubricant, to passively filter and otherwise remove particulate contaminates from the lubrication. The apparatus for containing lubricated mechanical components comprising a housing and a vessel. The vessel has an open top. The vessel is located proximate an inside surface of the housing. A filter is secured to the vessel. Lubrication contained within the housing flows along an inside surface of the housing into the vessel through the open top, and further flows out of the vessel through the filter.

13 Claims, 2 Drawing Sheets

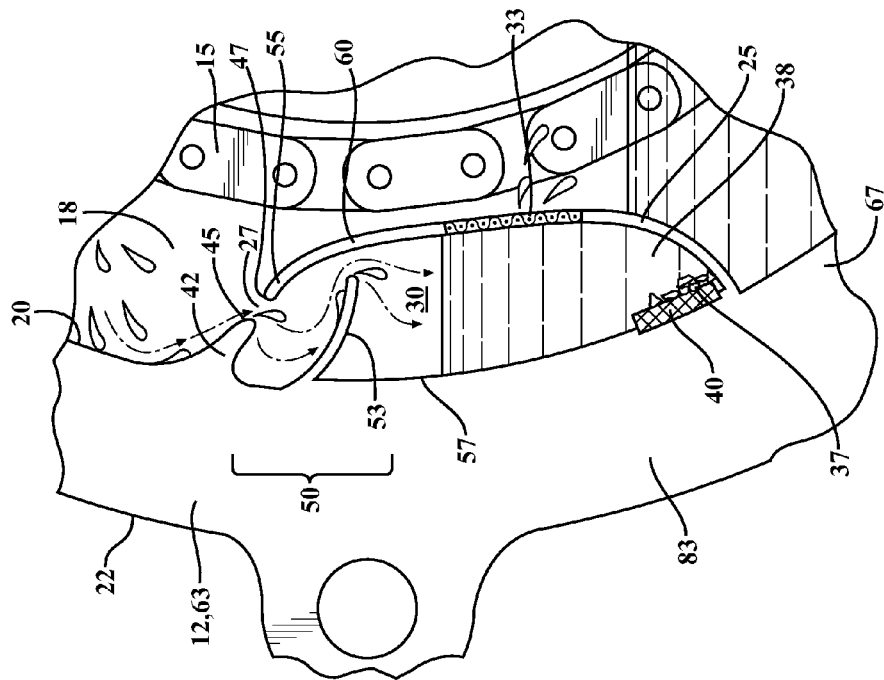
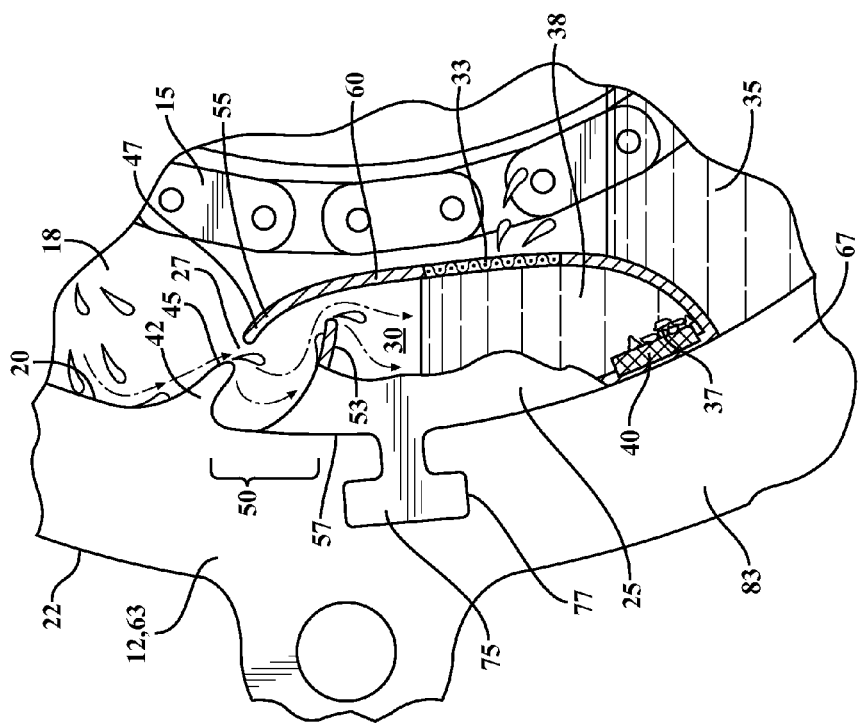

PASSIVELY FED BYPASS FILTER FOR SPLASH LUBRICATION

CROSS-REFERENCE TO RELATED APPLICATIONS

Not applicable.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly. Transfer of the power through the transfer case often utilizes various gear, and chain and sprocket systems. Transfer cases are often sealed closed during their assembly, ideally to remain sealed throughout the life of the transfer case Many of the components in a transfer case require lubrication. This lubrication is often sealed within the transfer case in the initial assembly. However, the lubrication within the transfer case can become contaminated over time as the various mechanical components within the transfer case wear against each other. This contamination often includes small bits of metal, and other materials such as ceramics and oxides, which can cause increased wear of the mechanical components, as compared to lubricant with less contaminant. Accordingly, an apparatus for reducing contaminants within a sealed housing enclosing lubricated mechanical components is desired.

SUMMARY

One aspect of the disclosed embodiments is an apparatus for containing lubricated mechanical components comprising a housing and a vessel. The housing has an inside surface, an outside surface and an interior. The vessel has an open top. The vessel is located proximate the inside surface of the housing. The open top provides fluid communication between an interior of the vessel and the interior of the housing. A filter is secured to the vessel. The filter provides fluid communication between the interior of the vessel and the interior of the housing. Lubrication contained within the housing flows along the inside surface of the housing into the vessel through the open top, and further flows out of the vessel through the filter.

Another aspect of the disclosed embodiments is a transfer case having a housing. The housing is formed by a first half and a second half, the housing having an inside surface, an outside surface and an interior. Lubrication fluid is disposed within the housing. A vessel having an open top is located proximate the inside surface of the housing. The open top provides communication between the interior of the vessel and the interior of the housing. The vessel includes a bottom and an outer edge. A protuberance extends away from one side of the vessel toward the housing. The protuberance is sandwiched between the first half of the housing and the second half of the housing. A filter is secured to the vessel, the filter providing communication between the interior of the vessel and the interior of the housing. A magnet is disposed in the interior of the vessel, the magnet located proximate the bottom of the vessel. The housing further includes a protruding portion that extends away from the inside surface of the housing. The protruding portion is located above the vessel. The protruding portion terminates before the outer edge of the vessel. Lubrication fluid flows along the inside surface of the housing into the vessel through the open top. The lubrication fluid further flows out of the vessel through the filter.

A third aspect of the disclosed embodiments is an apparatus for passively removing particulate matter from lubrication fluid contained within the housing. The apparatus includes a vessel having a first opening and a second opening. The first opening is spaced apart from, and located above, the second opening. The first opening provides access to an interior of the vessel by way of a labyrinth passage. The second opening providing access to the interior of the vessel by way of a filter. A magnet is disposed within the interior of the vessel. The lubrication fluid flows into the interior of the vessel through the first opening and out of the vessel through the second opening, with particulate removed from the lubrication fluid by the filter and maintained with the vessel by the magnet.

BRIEF DESCRIPTION OF THE DRAWINGS

The description herein makes reference to the accompanying drawings, wherein like referenced numerals refer to like parts throughout several views, and wherein:

FIG. 2 is an illustration of a close up of a portion of the transfer case of FIG. 1 showing a vessel; and FIG. 3 is an illustration of an alternate embodiment of the vessel shown in FIG. 2.

DETAILED DESCRIPTION

Figure 1:
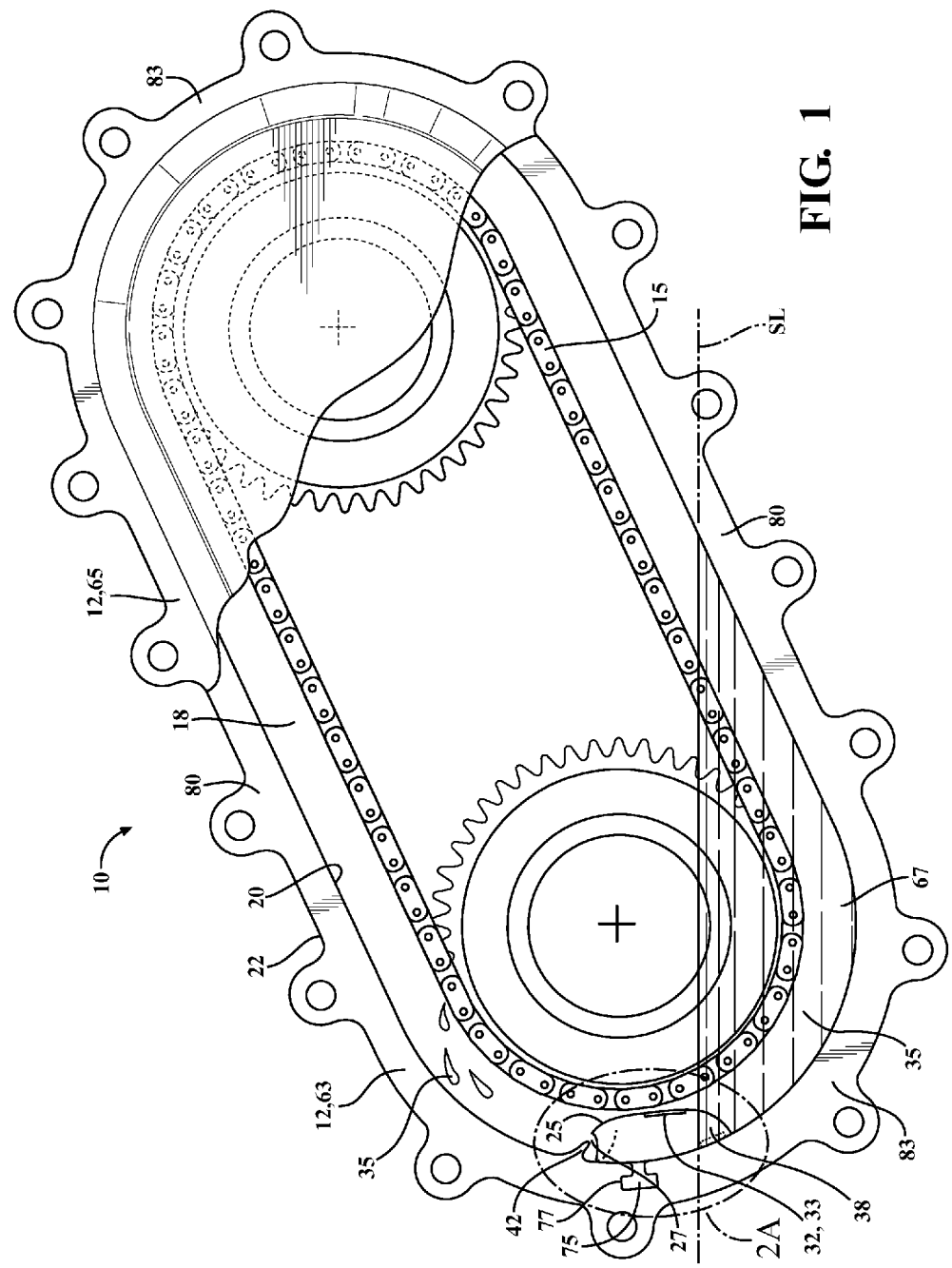
FIG. 1 is an illustration of a transfer case.

The disclosure herein is directed to an apparatus for reducing contaminants in lubrication for a transfer case. The apparatus utilizes the tendencies of a transfer case to splash and otherwise project internal sealed lubricant in numerous directions within the case, along with gravitational forces acting on the lubricant, to passively filter and otherwise remove particulate contaminates from the lubrication. Simultaneously, the apparatus is designed such that components within the case are not starved of necessary lubrication.

FIG. 1 shows a transfer case 10 that includes a housing 12. The housing 12 encloses lubricated mechanical components 15 within an interior 18 of the housing 12, such as gears interfacing with a chain drive. In the illustration, part of the housing 12 is broken away to reveal the interior 18 of the housing 12.

The housing 12 includes an inside surface 20 and an opposing outside surface 22. The inside surface 20 is located on the same side of the housing 12 as the interior 18 of the housing 12.

A vessel 25 is disposed within the housing 12, located proximate the inside surface 20 of the housing 12. The vessel 25 has an open top 27 providing fluid communication between an interior 30 of the vessel 25 and the interior 18 of the housing 12. The open top 27 is located on the vessel at an upper end of the vessel 25 when the transfer case 10 is installed in a vehicle such that gravity is able to urge fluid flow downward through the open top into the vessel 25. The vessel 25 also includes a second opening 32. The second opening is covered by a filter 33 to provide fluid communication between the interior 30 of the vessel 25 and the interior 18 of the housing 12 such that for fluid to exit the vessel 25, the fluid must pass through the filter 33. The filter 33 can be made of any material that is able to retain contaminant particles and allow the fluid to pass through it while enduring the operating conditions within the transfer case 10. One example of a suitable filter material is an open cell ceramic wick.

In normal operation of the transfer case 10, lubrication fluid 35 is thrown all about the interior 18 of the housing 12. The lubrication fluid 35 flows along the inside surface 20 of the housing 12 and into the interior 30 of the vessel 25 through the open top 27. The lubrication fluid 35 then flows out of the vessel 25 through the filter 33, with particulate contaminants 37 retained in the vessel 25. Within the housing 12, the vessel 25 is orientated such that the above described lubrication fluid 35 flows may be enabled by the force of gravity. If the open cell ceramic wick is used for the filter 33, the wick would use capillary pressure to segregate particulate contaminants 37 from the lubrication fluid 35.

FIG. 2 shows a close-up portion of area 2A from FIG. 1. The vessel 25 shown in FIG. 2 has been broken away to provide a better illustration of the internal features of the vessel 25. As can be seen in FIG. 2, the filter 33 may be located spaced apart from a bottom 38 of the vessel 25. The bottom 38 of the vessel 25 is defined as an area of the interior 30 of the vessel 25 in which the lubrication fluid 35 collects when the transfer case 10 is installed in a vehicle. Spacing the filter 33 apart from the bottom 38 of the vessel 25 allows filtered out particulate contaminants 37 to settle out separate from the filter 33, thus helping to prevent the filter 33 from being clogged and enabling more efficient operation.

In addition to the filter 33, a magnet 40 may be utilized to retain particulate contaminants 37 within the vessel 25. The magnet 40 may be secured within the interior 30 of the vessel 25 proximate the bottom 38 of the vessel 25. Ferro-metallic particulate, such as worn bits of the mechanical components 15, will be attracted to the magnet 40. Thus, the magnet 40 at the bottom 38 of the vessel 25 and gravitational forces will help maintain particulate contaminants 37. The magnet 40 may be secured to the vessel 25 by magnetic force alone, for example when the vessel 25 is made of ferro-metallic material. Adhesives, fasteners, and other means may also be used to secure the magnet 40.

To assist fluid flow into the open top 27 of the vessel 25, the housing 12 includes a protruding portion 42. The protruding portion 42 extends away from the housing 12 in at least a slightly downward angle such that the lubrication fluid 35 will flow off of a distal end 45 of the protruding portion 42, not continue to flow down the inside surface 20. The protruding portion 42 terminates at the distal end 45 before extending beyond an outer edge 47 of the vessel 25. The outer edge 47 is a point on the vessel 25 that is the furthest from the housing 12 as possible that directs fluid into the open top 27. The outer edge 47 is the outer most point on the open top 27; however, it could be further out, for example if the vessel 25 had a top with a scoop-like shape or other similar structural geometric design whereby flow of lubrication fluid 35 is diverted into the open top 27. Terminating the protruding portion 42 at the distal end 45 inboard of the outer edge 47 assists in maximizing the amount of lubrication fluid 35 entering, and therefore exiting, the vessel 25.

The open top 27 of the vessel 25 provides fluid communication through a labyrinth passage 50. The labyrinth passage 50 includes one or more members, such as a first member 53 and a second member 55, directing the flow of lubrication fluid 35 such that the lubrication fluid 35 is forced to travel laterally, as well as vertically, when passing through the open top 27. The labyrinth passage 50 helps to prevent lubrication fluid 35 within the vessel 25 from exiting via the open top 27 when the transfer case 10 is jostled, rocked, and otherwise subjected to typical driving forces such as acceleration, braking and bumps on a road.

The first member 53 extends away from one side 57 of the vessel 25 toward an opposite side 60 of the vessel 25. The second member 55 extends away from the opposite side 60 of the vessel 25 toward the one side 57. The first member 53 is spaced apart vertically from the second member 55 such that the first member 53 is located below the second member 55. The first member 53 and the second member 55 extend far enough so as to overlap a portion of each other. The first member 53 is sloped downward to a sufficient degree to allow the lubrication fluid 35 to flow into the vessel 25 by way of gravitational forces. For lubrication fluid 35 to exit the vessel 25 through the labyrinth passage 50, the lubrication fluid 35 must first travel vertically between the first member 53 and the opposite side 60 of the vessel 25, then the lubrication fluid 35 must travel laterally to get around the second member 55 before finally traveling vertically to exit the vessel 25.

The housing 12 is made up of a first half 63 and a second half 65 held together with a series of bolts. A seal material may be sandwiched between the first half 63 and second half 65 along the area in which they abut each other to prevent lubrication fluid 35 from escaping, or contaminants from entering, the interior 18 of the housing 12. A bottom 67 of the housing 12 is defined as an area of the housing 12 in which the lubrication fluid 35 collects when the transfer case 10 is installed in a vehicle for which it was designed. The amount of lubrication fluid 35 within the interior 18 of the housing 12 is typically a predetermined amount of lubrication fluid 35. The amount may be determined by various design criteria such as: a volume of the interior 18 of the housing 12; an anticipated amount of lubrication fluid 35 to be distributed throughout the transfer case 10 onto the inside surface 20 and on the mechanical components 15 during operation; based on a volume of the interior 30 of the vessel 25.

The interior of the vessel 25 has a volume. The volume of the vessel 25 is defined as the volume of fluid that can be retained in the vessel 25 before the fluid overflows, or can no longer enter, the open top 27 of the vessel 25. The volume of the vessel 25 is less than the predetermined amount of lubrication fluid 35 contained within the housing 12. The volume of the vessel 25 may be less than the predetermined amount of lubrication fluid 35 contained within the housing 12 by a predetermined amount. This predetermined difference between the volume of the vessel 25 and the predetermined amount of fluid may be determined by various design criteria such as: the volume of the interior 18 of the housing 12; the anticipated amount of lubrication fluid 35 to be distributed throughout the transfer case 10 onto the inside surface 20 and on the mechanical components 15 during operation, etc. Having the predetermined amount of lubrication fluid 35 be greater than the volume of the vessel 25 provides that lubrication fluid 35 is still available to the mechanical components 15 even when the vessel 25 is full of lubrication fluid 35. For example, the vessel 25 could fill with lubrication fluid 35 when the rate of lubrication fluid 35 entering the vessel 25 through the open top 27 is greater than the rate of lubrication fluid 35 flowing out through the filter 33.

With reference again to FIG. 1, a static oil level SL in the housing 12 is defined by a top level 70 of the lubrication fluid 35 when the transfer case 10 is in an initial condition state. The initial conditional state is one where a sufficient amount of time has lapsed since operation of the transfer case 10 such that the lubrication fluid 35 has substantially drained off the inside surface 20 of the housing 12 and off the mechanical components 15. In the initial condition state, not all lubrication will have drained, as some will likely remain as a film on the inside surface 20 of the housing 12 and on the mechanical components 15.

The filter 33 is located above the static oil level SL. Lubrication fluid 35 flows in and out of the vessel 25 and is enabled by gravitation forces. Locating the filter 33 above the static oil level SL allows the most amount of lubrication fluid 35 to flow out of the vessel 25 through the filter 33. If a portion of the filter 33 was located below the static oil level SL, the lubrication fluid 35 could still be urged out of the filter 33, for example when a level of lubrication fluid 35 in the vessel 25 is higher than a level of lubrication fluid 35 in the housing 12. However, such configuration would be less efficient, as the lubrication fluid 35 outside the vessel 25 may produce a back pressure on the filter 33.

As shown in FIGS. 1 and 2, the vessel 25 may include a protuberance 75. The protuberance 75 extends away from the one side 57 of the vessel 25 toward the housing 12. The protuberance 75 is generally shaped like a pair of cylinders stacked one on the other, with the cylinder farther from the vessel 25 having a larger diameter than the cylinder located closer to the vessel 25.

The protuberance 75 is revived in a cavity 77, and sandwiched between the first half 63 of the housing 12 and the second half 65 of the housing 12. The cavity 77 is defined by a first portion of the cavity in the first housing 12 and a second portion of the cavity in the second housing 12. The first portion of the cavity and the second portion of the cavity are generally shaped to conform to the shape of the protuberance 75. Capturing the protuberance 75 in the cavity 77 between the first half 63 of the housing 12 and the second half 65 of the housing 12 maintains the vessel 25 in the proper location within the housing 12.

The housing 12 includes generally straight portions 80 and generally curved portions 83 along its perimeter. The curved portions 83 of the housing 12 are located at opposing ends, and have a curvature that is similar to adjacent mechanical components 15 housed therein. The straight portions 80 connect the curved portions 83 to each other to form a continuous loop. The vessel 25 is located along one of the curved portions 83. The one side 57 of the vessel 25 has a curvature that corresponds to the curvature on the inside surface 20 of the housing 12 at the curved portion 83 where the vessel 25 is located.

Lastly, with reference now to FIG. 3, an alternate embodiment is shown where the vessel 25 is integrally formed with the housing 12, for example, where each half of the housing 12 and the associated vessel 25 structure is manufactured as a single cast element.

While the disclosure has been made in connection with what is presently considered to be the most practical and preferred embodiment, it should be understood that the disclosure is intended to cover various modifications and equivalent arrangements.

The vessel 25, housing 12, and their associated structures may be produced, for example, out of metal with known casting processes, out of plastic with known injection molding processes, or by way of any other suitable material and manufacturing processes known to those skilled in the art.

One having ordinary skill in the art and those who practice the invention will understand from this disclosure that various modifications and improvements may be made without departing from the spirit of the disclosed inventive concept. One will also understand that various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

The invention claimed is:

1. An apparatus for containing lubricated mechanical components comprising:
    a housing having an inside surface, an outside surface and an interior;
    a vessel having an open top and an outlet opening, the vessel located proximate the inside surface of the housing, the open top providing communication between an interior of the vessel and the interior of the housing;
    a filter secured to the vessel, the filter providing communication between the interior of the vessel and the interior of the housing;
    a predetermined amount of lubrication fluid disposed within the interior of the housing; and
    a static oil level defined by the predetermined amount of lubrication fluid in an initial condition state,
    wherein the vessel is located on the inside surface of the housing such that the outlet opening of the vessel is positioned above the static oil level, lubrication fluid flows along the inside surface of the housing into the vessel through the open top, lubrication flows through the filter, and lubrication fluid further flows out of the vessel into the interior of the housing by the force of gravity through the outlet opening.

2. The apparatus of claim 1, further comprising:
    the vessel including a bottom; and
    a magnet disposed in the interior of the vessel, the magnet located proximate the bottom of the vessel.

3. The apparatus of claim 1, further comprising:
    the vessel including a bottom; and
    the filter covers the outlet opening and is spaced apart from the bottom of the vessel, wherein debris in the lubrication fluid settles to the bottom of the vessel, and the debris is maintained in the bottom of the vessel.

4. The apparatus of claim 1, further comprising:
    a predetermined amount of lubrication fluid disposed within the interior of the housing; and
    the interior of the vessel having a volume, the volume of the interior of the vessel being less than the predetermined amount of lubrication fluid.

5. The apparatus of claim 1, wherein the open top of the vessel includes a labyrinth passage.

6. The apparatus of claim 5, wherein the labyrinth passage includes a first member and a second member, the first member extending from one side of the vessel, the second member extending from an opposite side of the vessel, the first member spaced apart vertically from the second member, and the first member and second member extending far enough to overlap a portion of each other.

7. The apparatus of claim 1, wherein at least part of the vessel is formed by the housing.

8. An apparatus for containing lubricated mechanical components comprising:
    a housing having an inside surface, an outside surface and an interior;
    a vessel having an open top, the vessel located proximate the inside surface of the housing, the open top providing communication between an interior of the vessel and the interior of the housing; and
    a filter secured to the vessel, the filter providing communication between the interior of the vessel and the interior of the housing,
    wherein the vessel includes an outer edge, the housing includes a protruding portion that extends away from the inside surface of the housing, the protruding portion located above the vessel, the protruding portion terminating before the outer edge of the vessel, lubrication fluid flows along the inside surface of the housing into the vessel through the open top, and lubrication fluid further flows out of the vessel through the filter.

9. An apparatus for containing lubricated mechanical components comprising:
a housing having an inside surface, an outside surface and an interior;
a vessel having an open top, the vessel located proximate the inside surface of the housing, the open top providing communication between an interior of the vessel and the interior of the housing; and
a filter secured to the vessel, the filter providing communication between the interior of the vessel and the interior of the housing,
wherein the vessel includes a protuberance, the housing includes a cavity, the cavity is shaped to capture the protuberance, the protuberance of the vessel is disposed within the cavity of the housing, lubrication fluid flows along the inside surface of the housing into the vessel through the open top, and lubrication fluid further flows out of the vessel through the filter.

10. The apparatus of claim 9, wherein the housing is formed by a first half and a second half, a first portion of the cavity is formed in the first half of the housing and a second portion of the cavity is formed in the second half of the housing, and the protuberance of the vessel is sandwiched between the first half of the housing and the second half of the housing.

11. The apparatus of claim 9, wherein the housing includes a generally linear area and a curved area, and the vessel is located proximate the curved area.

12. A transfer case comprising:
a housing, formed by a first half and a second half, having an inside surface, an outside surface and an interior;
lubrication fluid disposed within the housing;
a vessel having an open top, the vessel located proximate the inside surface of the housing, the open top providing communication between an interior of the vessel and the interior of the housing, the vessel including a bottom and an outer edge;
a protuberance extending away from one side of the vessel toward the housing, the protuberance sandwiched between the first half of the housing and the second half of the housing;
a filter secured to the vessel, the filter providing communication between the interior of the vessel and the interior of the housing;
a magnet disposed in the interior of the vessel, the magnet located proximate the bottom of the vessel; and
the housing further including a protruding portion that extends away from the inside surface of the housing, the protruding portion located above the vessel, and the protruding portion terminating before the outer edge of the vessel,
wherein lubrication fluid flows along the inside surface of the housing into the vessel through the open top, and lubrication fluid further flows out of the vessel through the filter.

13. An apparatus for passively removing particulate matter from lubrication fluid contained within a housing, the apparatus comprising:
a vessel having a first opening, a second opening, and a bottom, wherein the second opening is disposed above and spaced apart from the bottom;
the first opening spaced apart from, and located above, the second opening;
the first opening providing access to an interior of the vessel by way of a labyrinth passage;
the second opening providing access to the interior of the vessel by way of a filter; and
a magnet disposed within the interior of the vessel,
wherein the lubrication fluid flows into the interior of the vessel through the first opening, and out of the second opening by the force of gravity, with particulate removed from the lubrication fluid by the filter such that the particulate settles to the bottom of the vessel and is maintained within the vessel by the magnet.

* * * * *